United States Patent [19]

Muller et al.

[11] 4,105,600
[45] Aug. 8, 1978

[54] NITROGEN CONTAINING CHEMICAL COMPOUNDS AND A PROCESS FOR MAKING POLYURETHANES WITH THE NEW COMPOUNDS AS A CATALYST

[75] Inventors: Erwin Müller; Heinz Thomas, both of Leverkusen, Germany

[73] Assignee: Bayer Aktiengesellschaft, Leverkusen, Germany

[21] Appl. No.: 758,536

[22] Filed: Jan. 12, 1977

Related U.S. Application Data

[63] Continuation of Ser. No. 466,657, May 3, 1974, abandoned.

[51] Int. Cl.$^2$ .............................................. C08G 18/18
[52] U.S. Cl. ............................. 521/129; 260/561 A; 264/54; 264/46.5; 428/315; 560/158; 560/159; 528/53
[58] Field of Search ....... 260/482 B, 482 C, 77.5 AC, 260/561 A, 2.5 AC, 75 NC; 264/46.5, 54; 428/315; 560/158, 159

[56] References Cited

U.S. PATENT DOCUMENTS

| | | | |
|---|---|---|---|
| 2,941,967 | 6/1960 | Moller | 260/77.5 AC |
| 3,170,901 | 2/1965 | Melamed | 260/561 A |
| 3,239,480 | 3/1966 | Windemuth | 260/77.5 AC |
| 3,243,389 | 3/1966 | Moller | 260/77.5 AC |
| 3,314,901 | 4/1967 | Daumiller | 260/77.5 AC |
| 3,400,157 | 9/1968 | Poppelsdorf | 260/77.5 AC |
| 3,573,255 | 3/1971 | Cyba | 260/77.5 AC |

FOREIGN PATENT DOCUMENTS 670,993   9/1963   Canada ........................... 260/77.5 AC

*Primary Examiner*—M. J. Welsh
*Attorney, Agent, or Firm*—Gene Harsh; Joseph C. Gil; William E. Parry

[57] ABSTRACT

New chemical compounds containing the radicals —CO—NH—CH$_2$—OR;

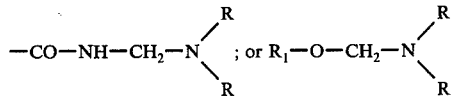

wherein R is an alkyl radical having one to six carbon atoms and R$_1$ is an alkylene radical having one to six carbon atoms and a process for making polyurethanes with the new compounds as a catalyst are provided.

8 Claims, No Drawings

NITROGEN CONTAINING CHEMICAL COMPOUNDS AND A PROCESS FOR MAKING POLYURETHANES WITH THE NEW COMPOUNDS AS A CATALYST

This is a continuation of application Ser. No. 466,657, filed May 3, 1974, now abandoned.

This invention relates generally to novel chemical compounds and to a novel process for making polyurethane resins with the new compounds as catalysts.

The production of polyurethanes, e.g. flexible and rigid polyurethane foams, is already known. The catalysts hitherto used often contain a tertiary nitrogen atom which is, in most cases, bound to an aliphatic radical. The main effect of this tertiary nitrogen atom is to accelerate the reaction between isocyanato groups and reactive hydrogen containing groups to form urethane groups, urea groups or the like. At the same time, a certain amount of trimerization of the isocyanato group may take place, accompanied by additional cross-linking through isocyanurates. The heretofore available tertiary amines can be used to advantage in making polyurethane foams but some semi-rigid foams produced with these catalysts have not had optimum tensile strength and tear resistance and have sometimes failed to bond securely to a synthetic resin film in processes where a foamable reaction mixture is foamed in a mold against such a film to make a laminated structure.

It is therefore, an object of this invention to provide novel chemical compounds which can be used to advantage as catalysts in polyaddition reactions between reactive hydrogen atoms and isocyanato groups. Another object of the invention is to provide a novel process for making polyurethane resins. Still another object of the invention is to provide an improved process for making structures having a molded polyurethane foam laminated to a synthetic resinous film.

The foregoing objects and others are accomplished in accordance with this invention, generally speaking, by providing new chemical compounds which contain at least two of any one of the following groups or any combination of at least two of the groups having the formula:

(a) —CO—NH—CH$_2$—OR 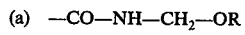

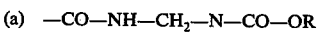

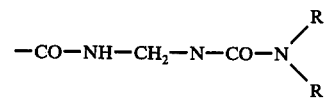

wherein R is an alkyl radical having one to six carbon atoms and R$_1$ is an alkylene radical having one to six carbon atoms. The compounds may also contain an aliphatically bound tertiary nitrogen atom in addition to the ones illustrated in (b) and (c). The radical (a) above is a carbonamide or urethane methylol alkyl ether group. Radical (b) is a carbonamide or urethane Mannich base and radical (c) is an O,N-acetal group. These compounds differ as catalysts for a urethane reaction from the usual catalysts which contain tertiary nitrogen atoms by not only accelerating the reaction between isocyanato groups and reactive hydrogen atoms but also by carbodiimide formation if a group (b) appears in the catalyst, and if the catalyst has a group (c) by isocyanurate formation. These compounds are also capable of reacting with isocyanates by insertion reactions. These proceed according to the following reaction schemes:

with
(a)    —CO—NH—CH$_2$—N—CO—OR         (a)

with

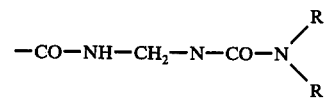

(with label b)

— CO—NH—CH$_2$—N—CO—N(R)(R)    (b)

with

—R—O—CH$_2$—N—CO—N(R)(R)    (c)

This invention is based on the finding that these new compounds are exceptionally highly active and universally active catalysts for the reaction of isocyanates with compounds which contain reactive hydrogen atoms. The following products are particularly preferred representatives of this class of compounds:

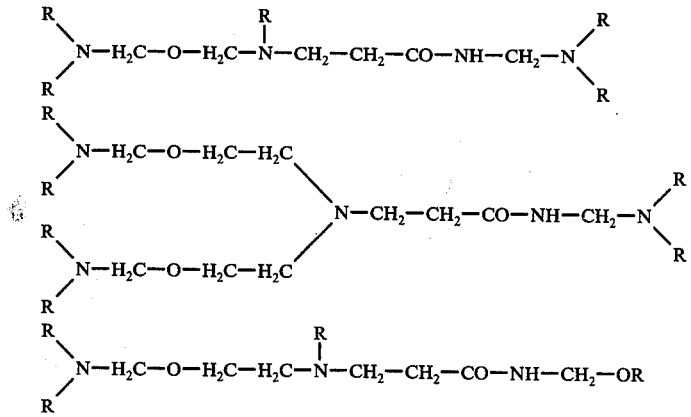

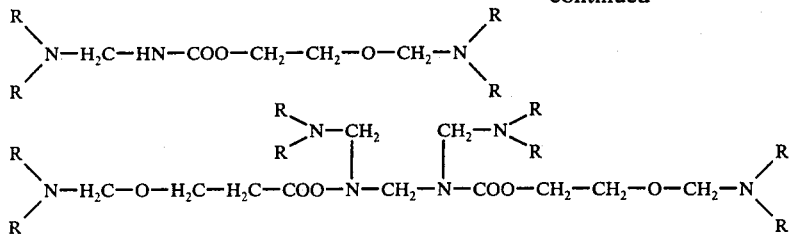

In the above formulae, R and R, have the same meanings as above. The following are specific examples of such compounds:

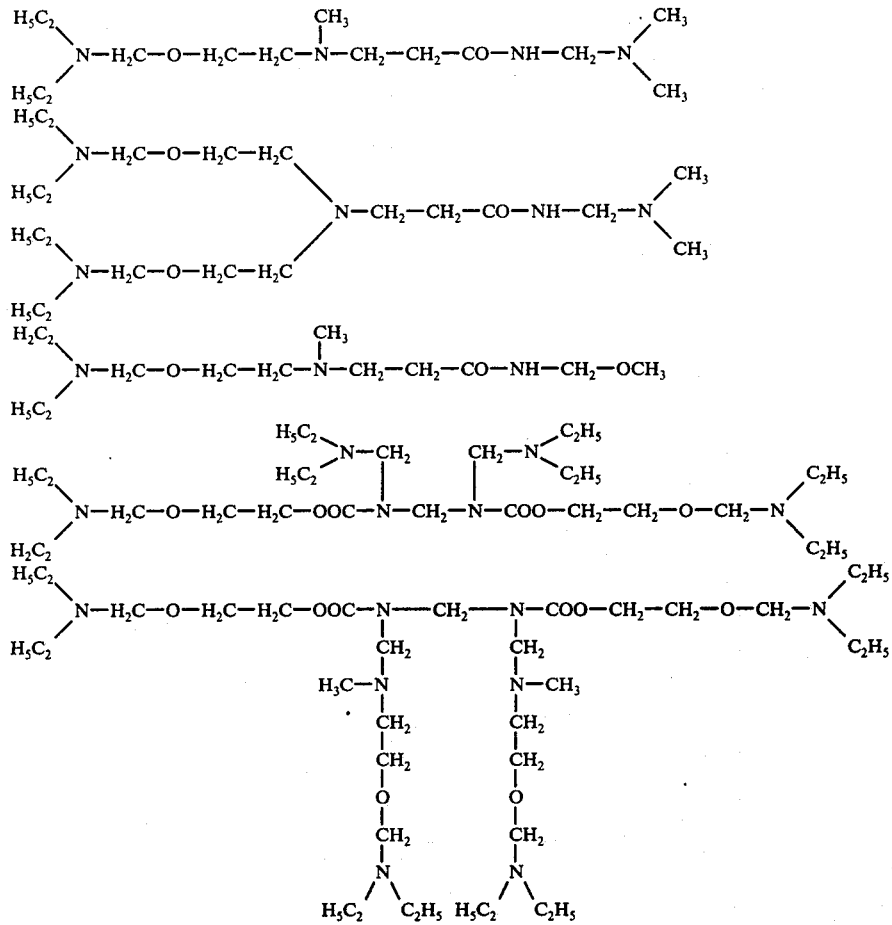

The new compounds can be prepared by known methods, for example, by introducing groups (a) and/or (b) followed by group (c) into the carbonamides or urethanes required as starting components. In the case of Compound I above, acrylamide is first converted into the unsaturated Mannich base by reaction with 1 mol of dimethylamine and 1 mol of formaldehyde (see Makromolekulare Chemie 57, 27–51 (1962)). Michael addition of 1 mol of N-methylethanolamine to the double bond takes place. The subsequent reaction with 1 mol of formaldehyde and 1 mol of diethylamine leads to the formation of the O,N-acetal in an anhydrous medium.

One of the more important advantages of the catalysts provided by the invention is that semi-rigid polyurethane foams produced therewith instead of with the prior art catalysts have substantially improved physical properties, for example, improved strength and tear resistance. Moreoever, the bond strength (without the addition of adhesive) of the semi-rigid polyurethane foam to synthetic resins such as acrylonitrile/butadiene/styrene polymers or polyvinyl chloride polymers is improved.

This invention, therefore, also relates to the use of a catalytic amount of a catalyst containing one or more of the new compounds in the production of polyurethanes, particularly polyurethane foams and preferably semi-rigid polyurethane foams.

Any suitable organic polyisocyanate may be used in accordance with the invention for making polyurethanes such as, for example, aliphatic, cycloaliphatic, araliphatic, aromatic or heterocyclic polyisocyanates of the kind described e.g. by W. Siefgen in Justus Liebigs Annalen der Chemie, 562, pages 75 to 136, the disclosure of which is incorporated herein by reference. For example, ethylene diisocyanate, tetramethylene-1,4-diisocyanate; hexamethylene-1,6-diisocyanate, dodecane-1,12-diisocyanate; cyclobutane-1,3-diisocyanate; cyclohexane-1,3-diisocyanate and cyclohexane-1,4-diisocyanate and any mixtures of these isomers; 1-isocyanato-3,3,5-trimethyl-5-isocyanatomethylcyclohexane (German Auslegeschrift No. 1,202,785) hexahydrotolylene-2,4-diisocyanate, hexahydrotolylene-2,6-diisocyanate and any mixtures of these isomers; hexahydro-1,3-phenylene diisocyanate, hexahydro-1,4-phenylene-diisocyanate; perhydro-2,4'-diphenylmethane diisocyanate, perhydro-4,4'-diphenylmethane diisocyanate, phenylene-1,3-diisocyanate, phenylene-1,4-diisocyanate, tolylene 2,4-diisocyanate, tolylene-2,6-diisocyanate and any mixtures of these isomers; diphenylmethane-2,4'-diisocyanate, diphenylmethane-4,4'-diisocyanate, naphthylene-1,5-diisocyanate, triphenylmethane-4,4',4''-triisocyanate, polyphenyl-polymethylene-polyisocyanates which can be obtained by aniline-formaldehyde condensation followed by phosgenation, e.g. those described in British Patent Specification Nos. 874,430 and 848,671, perchlorinated arylpolyisocyanates such as those described e.g. in German Auslegeschrift No. 1,157,601; polyisocyanates which contain carbodiimide groups as described in German Patent Specification No. 1,092,007; the diisocyanates described in U.S. Pat. No. 3,492,330; polyisocyanates which contain allophanate groups as described e.g. in British Patent Specification No. 994,890 Belgian Patent Specification No. 761,626 and published Dutch Patent Application No. 7,102,524 polyisocyanates which contain isocyanurate groups as described e.g. in German Patent Specification No. 1,022,789, 1,222,067 and 1,027,394 and in German Offenlegungsschriften No. 1,929,034 and 2,004,048, polyisocyanates which contain urethane groups as described e.g. in Belgian Patent Specification No. 752,261 or in U.S. Pat. No. 3,394,164; polyisocyanates which contain acylated urea groups in accordance with German Patent Specification No. 1,230,778; polyisocyanates which contain biuret groups as described e.g. in German Patent Specification No. 1,101,394 in British Patent Specification No. 889,050 and in French Patent Specification No. 7,017,514; polyisocyanates which have been prepared by telomerization reactions as described e.g. in Belgian Patent Specification No. 723,640; polyisocyanates which contain ester groups such as those mentioned e.g. in British Patent Specification No. 965,474; and 1,072,956 in U.S. Pat. No. 3,567,763 and in German Patent Specification No. 1,231,688 and reaction products of the above mentioned isocyanates with acetals in accordance with German Patent Specification No. 1,072,385 may be used.

The distillation residues which still contain isocyanate groups from the commercial production of isocyanates may also be used, if desired in the form of solutions in one or more of the above mentioned polyisocyanates. Any mixture of the above mentioned polyisocyanates may also be used.

Although the invention contemplates broadly the use of any organic polyisocyanates, it is generally preferred to use commercially readily available polyisocyanates such as tolylene-2,4-diisocyanate and tolylene-2,6-diisocyanate and any mixture of these isomers ("TDI"); polyphenyl-polymethylene polyisocyanates which can be obtained by aniline-formaldehyde condensation followed by phosgenation ("crude MDI") and polyisocyanates which contain carbodiimide groups, urethane groups, allophanate groups, isocyanurate groups, urea groups or biuret groups ("modified polyisocyanate").

The other starting components which must also be used for producing polyurethanes according to the invention are compounds which contain at least two hydrogen atoms determinable by the Zerewitinoff method and capable of reacting with isocyanates and which generally have a molecular weight of about 400 to about 10,000. Among these are included not only compounds which contain amino groups, thiol groups or carboxyl groups but also, and preferably, polyhydroxyl compounds, in particular polyhydric alcohols which contain from 2 to 8 hydroxyl groups, especially those with a molecular weight of about 800 to about 10,000, preferably about 1000 to about 6000. Any suitable organic compound may be used such as, for example, polyesters, polyethers, polythioethers, polyacetals, polycarbonates or polyester amides which contain at least two and generally 2 to 8 but preferably 2 to 4 hydroxyl groups, such as those known per se for the production of homogeneous (non-porous) and cellular polyurethanes.

The polyesters which contain hydroxyl groups may be, for example, reaction products of polyhydric alcohols, preferably dihydric alcohols to which trihydric alcohols may be added, with polybasic, preferably dibasic carboxylic acids. Instead of the free polycarboxylic acids, the corresponding polycarboxylic acid anhydrides or corresponding polycarboxylic acid esters of lower alcohols or their mixtures may be used for producing the polyesters. The polycarboxylic acids may be aliphatic, cycloaliphatic, aromatic and/or heterocyclic and may be substituted, e.g. with halogen atoms, and/or unsaturated. The following are examples of suitable carboxylic acids and anhydrides: succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride; endomethylene tetrahydrophthalic acid anhydride, glutaric acid anhydride, maleic acid, maleic acid anhydride; fumaric acid, dimeric and trimeric fatty acids such as oleic acid which may be mixed with monomeric fatty acids, dimethylterephthalate, bis-glycolterephthalate and the like. The following are examples of suitable polyhydric alcohols; ethylene glycol, propylene-1,2-glycol, propylene-1,3-glycol; butylene-1,4-glycol, butylene-2,3-glycol; hexane-1,6-diol; octane-1,8-diol; neopentyl glycol, cyclohexane dimethanol (1,4-bis-hydroxymethylcyclohexane); 2-methylpropane-1,3-diol; glycerol; trimethylolpropane, hexane-1,2,6-triol, butane-1,2,4-triol; trimethylolethane, pentaerythritol, quinitol; mannitol and sorbitol; methyl glucoside; diethylene glycol; triethylene glycol; tetraethylene glycol; polyethylene glycol; dipropylene glycol; polypropylene glycols; dibutylene glycol, polybutylene glycol and the like. The polyesters may also contain a certain proportion of terminal carboxyl groups. Polyesters of lactones such as ε-caprolactone or hydroxycarboxylic acids, e.g. ω-hydroxycaproic acid, may also be used. The above low molecular weight polyols which generally have a molecular weight of about 62 to about 400 may also be used as cross-linking agents or chain lengthening agents if desired.

The poly (alkylene ether) polyols suitable for the process according to the invention, which contain at least two and generally 2 to 8 hydroxyl groups but preferably 2 or 3 hydroxyl groups, are also known per se and may be prepared e.g. by the polymerization of epoxides such as ethylene oxide, propylene oxide, butylene oxide, tetrahydrofuran, styrene oxide or epichlorohydrin, each with itself, e.g. in the presence of $BF_3$ or by addition of these oxides, either as mixtures or successively, to starting components which contain reactive hydrogen atoms such as alcohols or amines, e.g. water, ethylene glycol, propylene-1,3-glycol, propylene-1,2-glycol, trimethylolpropane, 4,4'-dihydroxy-diphenylpropane, aniline, ammonia, ethanolamine, ethylene diamine or the like. Sucrose polyethers such as those described e.g. in German Auslegeschriften No. 1,176,358 and 1,064,938 may also be used for the process of the invention. It is in many cases preferred to use those polyethers which contain predominantly primary hydroxyl groups (up to 90% by weight, based on all the hydroxyl groups present in the polyether). Polyethers which have been modified by vinyl polymerization such as those obtained e.g. by the polymerization of styrene or acrylonitrile in the presence of polyethers (U.S. Pat. Nos. 3,383,351; 3,304,273; 3,523,093 and 3,110,695 and German Patent Specification No. 1,152,536) and polybutadienes which contain hydroxyl groups are also suitable.

Any suitable polythioether may be used such as, the condensation products of thiodiglycol with itself and/or with other glycols, dicarboxylic acids, formaldehyde, aminocarboxylic acids or aminoalcohols. The products obtained are either polythio mixed ethers or polythioether esters or polythioether ester amides, depending upon the cocoponent.

Any suitable polyacetal may be used such as the compounds which can be prepared e.g. from glycols such as diethylene glycol, triethylene glycol, 4,4'-dioxyethoxydiphenyldimethylmethane, hexanediol and formaldehyde. Polyacetals suitable for the process according to the invention may also be prepared by polymerizing cyclic acetals.

Any suitable polycarbonates with hydroxyl groups may be used such as those which can be prepared by reacting diols such as propane-1,3-diol, butane-1,4-diol, and/or hexane-1,6-diol, diethylene glycol, triethylene glycol or tetraethylene glycol with diaryl carbonates such as diphenylcarbonate or phosgene.

Any suitable polyester amide or polyamide may be used such as the predominantly linear condensates which can be obtained from polyvalent saturated and unsaturated carboxylic acids or their anhydrides and polyvalent saturated and unsaturated amino alcohols, diamines, polyamines or mixtures thereof.

Polyhydroxyl compounds which contain urethane or urea groups and modified or unmodified natural polyols such as castor oil, carbohydrates and starch may also be used. Addition products of alkylene oxides with phenolformaldehyde resins or with urea formaldehyde resins may also be used for the process of the invention.

Representatives of the various compounds which may be used in making polyurethanes according to the invention have been described e.g. in High Polymers, Volume XVI, "Polyurethanes, Chemistry and Technology," published by Saunders-Frisch, Interscience Publishers, New York, London, Volume I, 1962, pages 32–42 and pages 44–54 and Volume II, 1964, pages 5–6 and 198–199 and in Kunststoff-Handbuch, Volume VII, Vieweg-Hochtlen, Carl-Hanser-Verlag, Munich, 1966, e.g. on pages 45 to 71, the disclosures of which are incorporated herein by reference.

According to the invention, water and/or readily volatile organic substances are often added as blowing agents in the production of the polyurethanes. Any suitable blowing agent may be used such as, for example, halogenated alkanes such as methylene chloride, chloroform, ethylidene chloride, vinylidene chloride, monofluorotrichloromethane, chlorodifluoromethane and dichlorodifluoromethane, and butane, hexane, heptane and diethylethers. A blowing effect can also be obtained by adding compounds which decompose at temperatures above room temperature to liberate gases such as nitrogen, e.g. azo compounds such as azo isobutyric acid nitrile. Further examples of blowing agents and details of methods using blowing agents may be found in Kunststoff-Handbuch, Volume VII, published by Vieweg and Hochtlen, Carl-Hanser-Verlag, Munich 1966 e.g. on pages 108 and 109, 453 to 455 and 507 to 510, the disclosure of which is incorporated herein by reference.

Other known catalysts may also be included in the process according to the invention, in a quantity of about 0.001 to 10% by weight, based on the quantity of compounds which contain at least two hydrogen atoms reactive with isocyanates and have a molecular weight of about 400 to about 10,000, e.g. tertiary amines such as triethylamine, tributylamine, N-methyl-morpholine, N-ethyl-morpholine, N-cocomorpholine, N,N,N',N'-tetramethyl-ethylenediamine, 1,4-diazo-bicyclo-2,2,2]-octane, N-methyl-N'-dimethylaminoethyl-piperazine, N,N-dimethylbenzylamine, bis-(N,N-diethylaminoethyl)-adipate, N,N-diethylbenzylamine, pentamethyldiethylenetriamine, N,N-dimethylcyclohexylamine, N,N,N',N'-tetramethyl-1,3-butanediamine, N,N-dimethyl-$\beta$-phenylethylamine, 1,2-dimethylimidazole, 2-methylimidazole and the like.

Suitable tertiary amines which contain hydrogen atoms capable of reacting with isocyanate groups are e.g. triethanolamine, triisopropanolamine, N-methyldiethanolamine, N-ethyl-diethanolamine, N,N-dimethyl ethanolamine and their reaction products with alkylene oxides such as propylene oxide and/or ethylene oxide.

Silaamines which contain carbon-silicon bonds may also be used as catalysts, e.g. the compounds described in German Patent Specification No. 1,229,290 such as 2,2,4-trimethyl-2-silamorpholine and 1,3-diethylaminomethyltetramethyldisiloxane.

Bases which contain nitrogen such as tetraalkyl ammonium hydroxides, or alkali metal hydroxides such as sodium hydroxide, alkali metal phenolates such as sodium phenolate or alkali metal alcoholates such as sodium methylate may also be used as catalysts. Hexahydrotriazines are also suitable catalysts.

Organometallic compounds may be used as catalysts according to the invention, especially organic tin compounds.

The organic tin compounds used along with the novel catalysts of this invention are preferably tin(II) salts of carboxylic acids (stannous salts) such as tin(II) acetate, tin(II) octoate, tin(II) ethyl hexoate and tin(II) laurate and the stannic compounds such as the dialkyl tin salts of carboxylic acids including dibutyl tin diacetate, dibutyl tin dilaurate, dibutyl tin maleate, dioctyl tin diacetate or the like.

Other representatives of catalysts which may be used according to the invention and details of their mode of action are described in Kunststoff-Handbuch, Volume VII, published by Vieweg and Hochtlen, Carl-Hanser-Verlag, Munich 1966, e.g. on pages 96 to 102.

The novel catalysts are generally used in a quantity of about 0.001 to 10% by weight, based on the quantity of compounds which contain at least two hydrogen atoms reactive with isocyanates and have a molecular weight of about 400 to about 10,000.

Surface active additives (emulsifiers and foam stabilizers) may also be used in the process according to the invention. Suitable emulsifiers are e.g. the sodium salts of ricinoleic sulphonates or of fatty acids or salts of fatty acids with amines such as oleic acid diethylamine or stearic acid diethanolamine. Alkali metal or ammonium salts of sulphonic acids such as dodecylbenzene sulphonic acid or dinaphthylmethane disulphonic acid or of fatty acids such as ricinoleic acid or of polymeric fatty acids may also be used as surface active additives.

The foam stabilizers used are mainly water-soluble polyether siloxanes. The structure of these compounds is generally such that a copolymer of ethylene oxide and propylene oxide is joined to a polydimethylsiloxane group. Foam stabilizers of this kind have been described e.g. in U.S. Pat. No. 3,629,308 the disclosure of which is incorporated herein by reference.

Reaction retarders may also be used according to the invention, e.g. substances which are acid in reaction such as hydrochloric or organic acid halides. Cell regulators known per se may also be used, such as paraffins or fatty alcohols or dimethylpolysiloxanes. Pigments or dyes and flame retarding agents known per se such as tris-chloroethyl phosphate or ammonium phosphate and polyphosphate, stabilizers which protect against aging and weathering, plasticizers, fungistatic and bacteriostatic substances and fillers such as barium sulphate, kieselguhr, carbon black or whiting may also be used.

Other examples of surface active additives and foam stabilizers as well as cell regulators, reaction retarders, stabilizers, flame retarding substances, plasticizers, dyes, fillers and fungistatic and bacteriostatic substances which may be included in the process according to the invention and details concerning their use and mode of action are described in Kunststoff-Handbuch, Volume VI, published by Vieweg and Hochtlen, Carl-Hanser-Verlag, Munich 1966, e.g. pages 103 to 113.

According to the invention, the reactants may be reacted together by the known one-step, prepolymer or semi-prepolymer process, in many cases using foamable reaction mixtures and mechanical devices described in U.S. Pat. No. Re. 24,514. The reactants preferably have an NCO/OH index of 90 to 120. An index of 100 means that the stoichiometric ratio of reactive hydrogen atoms to isocyanate groups is 1:1. Details concerning apparatus which may be used for the process according to the invention are described in Kunststoff-Handbuch, Volume VI, published by Vieweg and Hochtlen, Carl-Hanser-Verlag, Munich 1966, e.g. on pages 121 to 205.

To produce semi-rigid foams, which are the preferred products of the process of the invention, the reaction mixture is introduced into a mold which is generally lined, preferably with a vacuum formed plastic foil or film. The mold may be made of metal, e.g. aluminium, or of a synthetic resin, e.g. an epoxide resin. The foamable reaction mixture foams up inside the mold to form the molded product. The process of foaming in the mold may be carried out in such a manner that the molded product will have a cellular structure on its surface or it may be carried out to produce a molded product with a compact skin and cellular core. According to the invention, the quantity of foamable reaction mixture introduced into the mold may be just sufficient to fill the mold after it has foamed up. Alternatively, a larger quantity of reaction mixture than is required for filling the interior of the mold with foam may be introduced. This method is known as overcharging, which has already been described e.g. in U.S. Pat. Nos. 3,178,490 or 3,182,104.

Any suitable waxy mold release agent may be used in the process of foaming in the mold.

One of the major commercial applications of the semi-rigid foams is in the field of upholstery manufacture. Both thin layered and thick walled foam moldings may be produced. They can generally be easily removed from the mold within only 10 minutes from the onset of foaming.

Polyurethanes can also be produced by the process of the invention for use in other fields, e.g. as lacquers, coating materials or elastomers or for the production of microporous foils or polyurethane dispersions or they may be used for agricultural purposes.

EXAMPLE 1

105 g of diethanolamine (1 mol) were added to 128 g of the following compound

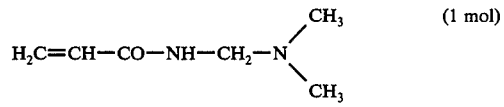 (1 mol)

with stirring and the mixture was heated to 70° to 80° C for 2 hours. When all the diethanolamine had been added, 150 g of diethylamine (2 mols + 4 g) and 60 g of para-formaldehyde (2 mols) were added with continued stirring, followed by the addition of 120 g of anhydrous potassium carbonate.

After 12 hours' heating at 80° C, the reaction mixture was filtered with suction to remove potassium carbonate, and the volatile constituents of the filtrate were distilled off at temperatures of up to 90° to 100° C at 12 mm Hg. A yellowish oil having the following formula remained behind:

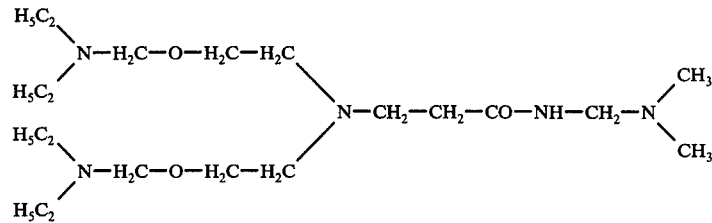

$C_{20}H_{45}N_5O_3$ Molecular weight 403
4.03 g used up 36.4 cc of N HCl
Calculated: equivalent weight 111; Found: equivalent weight 101
Yield: 276 g.

EXAMPLE 2

128 g of the following compound

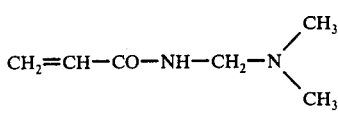  (1 mol)

were reacted with 75 g of N-methylethanolamine (1 mol) under the conditions described in Example 1 (temperature rise 40° C).

The reaction was then continued with 75 g of diethylamine and 30 g of paraformaldehyde after the addition of 100 g of potassium carbonate. A product having the following formula was obtained in a yield of 171 g:

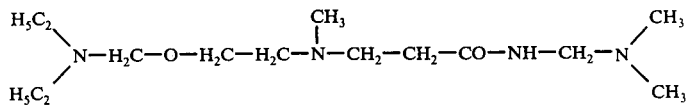

$C_{14}H_{32}O_2N_4$ Molecular weight 288
2.88 g used up 26.4 cc of N HCl
Found: equivalent weight 108; Calculated: equivalent weight 96

EXAMPLE 3

115 g of the following compound

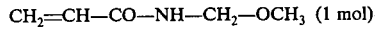 (1 mol)

were reacted with 75 g of N-methylethanolamine (1 mol) (exothermic reaction (exothermic to 70° C) under the conditions described in Example 1. The reaction was then continued with 75 g of diethylamine and 30 g of paraformaldehyde in the presence of 100 g of potassium carbonate.

About 190 g of the compound having the following formula was obtained:

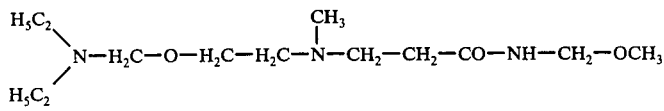

$C_{13}H_{29}O_3N_3$ Molecular weight 175
2.75 g used up 17.8 cc of N HCl
Calculated: equivalent weight 155; Found: equivalent weight 137.5.

EXAMPLE 4

222 g of the following compound:

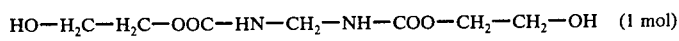 (1 mol)

(prepared by the process disclosed in U.S. Pat. No. 3,459,789) were reacted with 132 g of paraformaldehyde (4.4 mol) and 321 g of diethylamine (4.4 mol) with the addition of 120 g of anhydrous potassium carbonate. The reaction mixture was heated to 80° C for 5 hours and then filtered with suction and the filtrate was distilled at a temperature of up to 100° C at 12 mm Hg. About 103 g distillate and a yield of 409 g of the following compound was obtained:

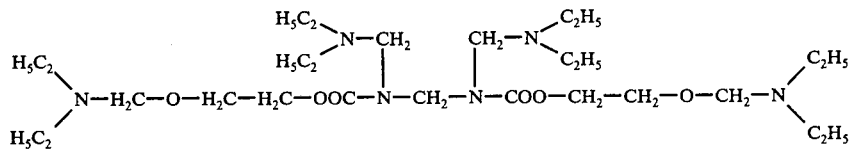

$C_{27}H_{58}O_6N_6$ Molecular weight 562
5.62 g of the above compound used up 38.2 cc of N HCl
Found: equivalent weight 147; Calculated: equivalent weight of 140.5.

EXAMPLE 5

222 g of the following compound:

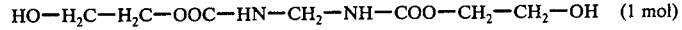 (1 mol)

were heated to 70° to 80° C for 2 hours together with 200 cc of formalin (30%) (2 mols) and 150 g of N-methyl-ethanolamine. The water was then evaporated off under vacuum and a further 132 g of paraformaldehyde (4.4 mol) and 321 g of diethylamine (4.4 mol) and 120 g of anhydrous potassium carbonate were added with stirring. After 8 hours' heating at 70° to 80° C, the volatile constituents were distilled off (90 g) at a temperature of 100° C/12 mm Hg.

Yield: 350 g of the following compound:

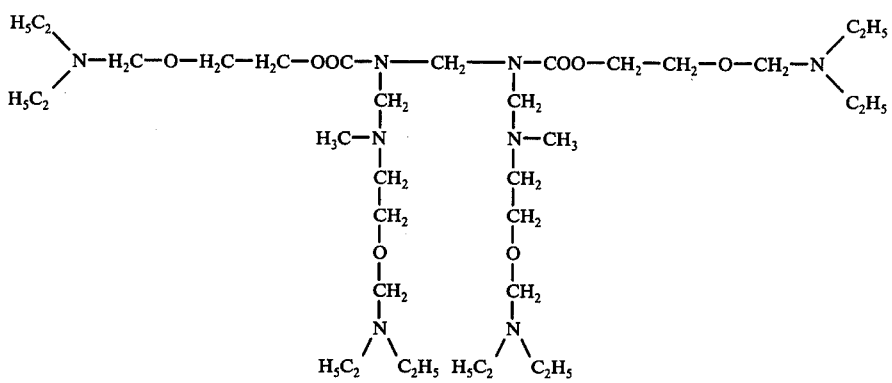

$C_{35}H_{76}O_8N_8$ Molecular weight 736

7.36 g of the compound used up 52.8 cc of N HCl

Found: equivalent weight 140; Calculated: equivalent weight 126.

EXAMPLE 6

90 g of a polyether with a molecular weight of 4800 which had been obtained by an addition reaction of propylene oxide (87% by weight) and ethylene oxide (13% by weight) with trimethylolpropane, 2 g of the compound prepared in Example 2 and having the formula:

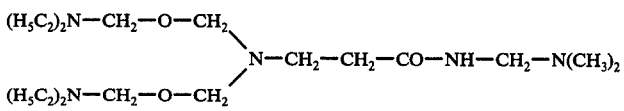

5 g of triethanolamine, 2 g of tall oil and 2.5 g of water were mixed together. This mixture was then vigorously mixed with 60 g of a polyphenyl-polymethylene polyisocyanate which had an NCO content of 31% and a viscosity of 200cP/20° C which had been obtained by phosgenating aniline-formaldehyde condensate and by distilling dinuclear diisocyanates off the phosgenation product until said viscosity has been reached.

Mixing of the components could be carried out by means of high pressure or low pressure feed apparatus. The foamable reaction mixture was introduced into an aluminium mold which has been lined with a vacuum formed ABS/PVC film (acrylonitrile/butadiene/styrene copolymer containing polyvinyl chloride and plasticizer). The foaming reaction set in immediately after introduction of the mixture. The degree of compression in the mold was approximately 1:2. The foam removed from the mold had the following properties:

| | | |
|---|---|---|
| Density DIN 53 420 | (kg/m³) | 153 |
| Tensile strength DIN 53 571 | (kg wt/cm²) | 3.9 |
| Elongation at break | | |

| | | |
|---|---|---|
| DIN 53 571 | (%) | 40 |
| Compression strength DIN 53 577 | | |
| 40% compression | (p/cm²) | 1,140 |
| Bond strength between foam and ABS/PVC foil | (p) | 1,210–1,450 |

EXAMPLE 7

90 g of the polyether used in Example 6, 1.5 g of the compound prepared in Example 1 having the formula:

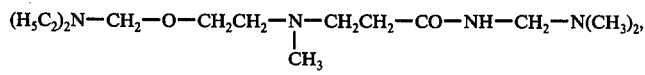

5 g of triethanolamine, 2 g of tall oil, 2.5 g of water and 60 g of the polyisocyanate used in Example 6, were reacted together.

The resulting foam had a degree of compression of about 1:2.5 and the following properties:

| | | |
|---|---|---|
| Density DIN 53 420 | (kg/m³) | 150 |
| Tensile strength DIN 53 571 | (kg.wt/cm²) | 4.0 |
| Elongation at break DIN 53 571 | (%) | 50 |
| Compression strength DIN 53 577 | (p/cm²) | 1,015 |
| 40% compression Bond strength between foam and ABS/PVC foil | (p) | 1,150–1,320 |

EXAMPLE 8

90 g of the polyether used in Example 6, 3 g of the compound prepared in Example 3 and having the formula:

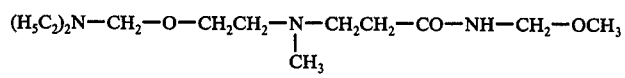

5 g of triethanolamine, 2 g of tall oil, 2.5 g of water and 60 g of the polyisocyanate used in Example 6 were reacted together under the conditions described in Example 6.

The foam had a degree of compression of about 1:2 and the following properties:

| Density DIN 53 420 | (kg/m³) | 165 |
|---|---|---|
| Tensile strength DIN 53 571 | (kg wt/cm²) | 3.6 |
| Elongation at break DIN 53 571 | (%) | 45 |
| Compression strength DIN 53 577 40% compression | (p/cm²) | 1,020 |
| Bond strength between foam and ABS/PVC foil | (p) | 1,720–1,860 |

EXAMPLE 9

90 g of the polyether described in Example 6, 3 g of the compound of Example 4 and having the formula:

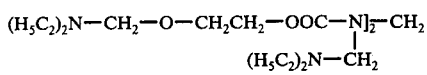

5 g of triethanolamine, 2 g of tall oil, 2.5 g of water and 60 g of the polyisocyanate used in Example 6 were reacted together under the conditions described in Example 6. The foam obtained had a degree of compression of about 1:2 and the following properties:

| Density DIN 53 420 | (kg/m³) | 150 |
|---|---|---|
| Tensile strength DIN 53 571 | (kg wt/cm²) | 4.1 |
| Elongation at break DIN 53 571 | (%) | 55 |
| Compression strength DIN 53 577 40 % compression | (p/cm²) | 990 |
| Bond strength between foam and ABS/PVC foil | (p) | 1,630–1,870 |

Other chemical compounds of the class provided by the invention can be prepared by processes similar to those set forth in the foregoing examples and other known components of a foamable polyurethane composition can be substituted for those in Examples 6 through 9. Any of the compounds having the radicals (a), (b) or (c) can be substituted for those in the examples for making a polyurethane foam.

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. In a process for making a polyurethane wherein an organic polyisocyanate is reacted with an organic compound having at least two reactive hydrogen atoms determinable by the Zerewitinoff method, the improvement which comprises including in the reaction mixture a compound having the formula:

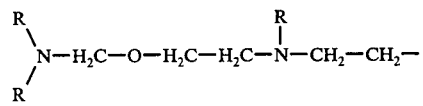

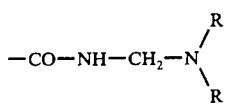

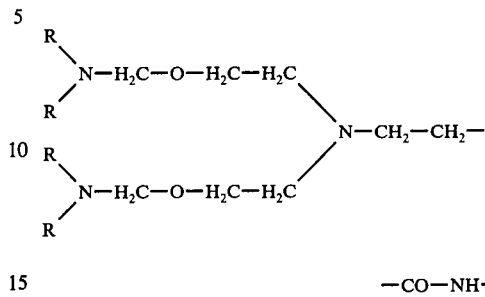

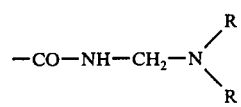

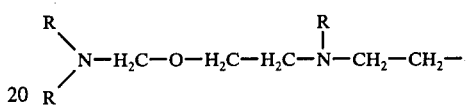

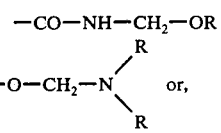

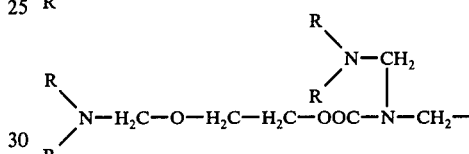

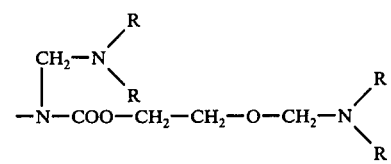

wherein R is an alkyl radical having up to six carbon atoms.

2. The process of claim 1 wherein the reaction mixture contains a blowing agent and the polyurethane is a foam.

3. The process of claim 2 wherein the reaction takes place in a closed mold.

4. The process of claim 3 wherein the mold has a plastic film as a liner for at least a portion of its inner wall and the resulting foam becomes bonded to the film.

5. The product of the process of claim 4.

6. The process of claim 1 wherein said compounds of the formulae are used in admixture with an additional catalyst for the isocyanate-reactive hydrogen reaction.

7. In a process for making a polyurethane wherein an organic polyisocyanate is reacted with an organic compound having at least two reactive hydrogen atoms determinable by the Zerewitinoff method, the improvement which comprises including as a catalyst in the reaction mixture a compound containing groups from the groups consisting of (a) —CO—NH—CH₂—OR

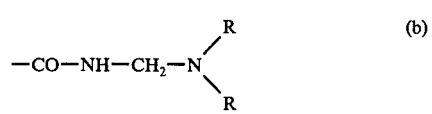

-continued
alkyl radical having up to six carbon atoms and $R_1$ is an alkylene radical containing up to six carbon atoms.
8. A compound of the formula:
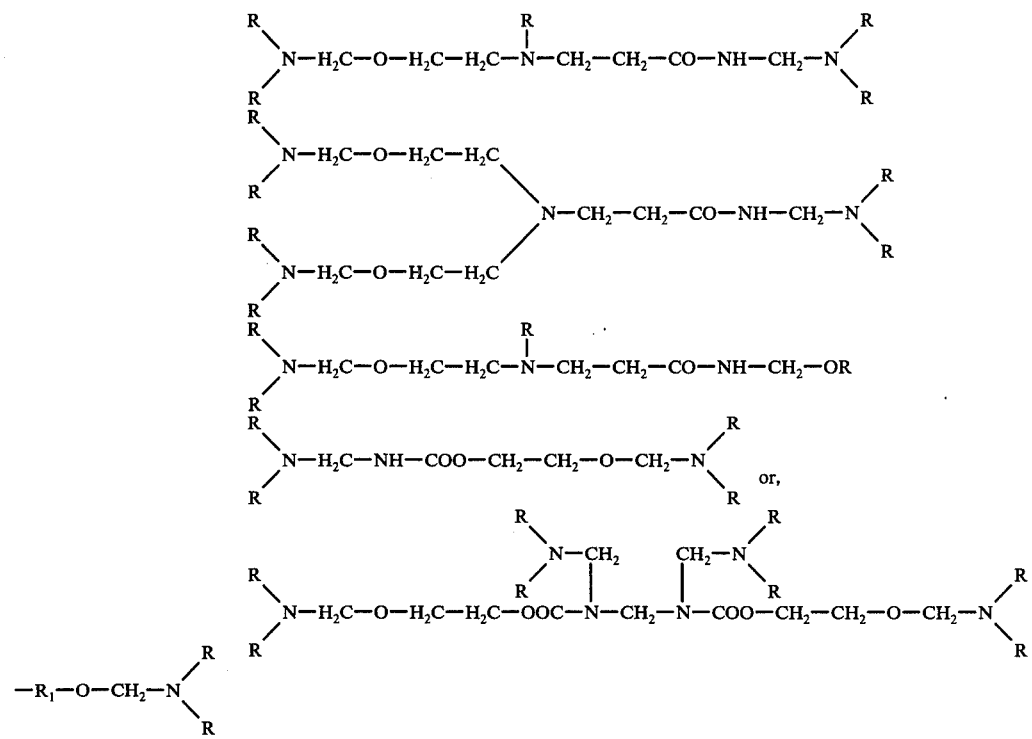
wherein the catalyst compound contains at least groups (a) and (b), (b) and (c), or (a) and (c) wherein R is an alkyl radical having up to six carbon atoms.
* * * * *